United States Patent [19]
Williams

[11] 3,943,626
[45] Mar. 16, 1976

[54] PIPE CUTTER

[76] Inventor: Leonard H. Williams, 4100 N. Romera Road Space No. 112, Tucson, Ariz. 85705

[22] Filed: Jan. 23, 1975

[21] Appl. No.: 543,409

[52] U.S. Cl. .................................................. 30/100
[51] Int. Cl.² ...................... B23D 21/10; B26D 3/16
[58] Field of Search ............................... 30/95, 100

[56] References Cited
UNITED STATES PATENTS

| | | | |
|---|---|---|---|
| 1,130,395 | 3/1915 | Gilmour | 30/100 |
| 1,173,496 | 2/1916 | Elzay | 30/100 |
| 2,761,212 | 9/1956 | Gill | 30/100 |

Primary Examiner—Al Lawrence Smith
Assistant Examiner—J. T. Zatarga
Attorney, Agent, or Firm—Oliver D. Olson

[57] ABSTRACT

A U-shaped body member has key slots adjacent opposite ends thereof arranged to have removable connection at spaced points in a chain of a chain pipe wrench. A cutter bit projects adjustably beyond the bottom portion of the body member for cutting a pipe peripherally by multiple turns of the wrench around the pipe in a reverse direction from that at which the lever handle has gripping connection on a pipe. Guide and gauge wheels are provided on opposite sides of the cutter bit for guiding it in a cut and for maintaining the depth of the cut as determined by adjustment of the cutter bit.

5 Claims, 5 Drawing Figures

U.S. Patent   March 16, 1976   3,943,626
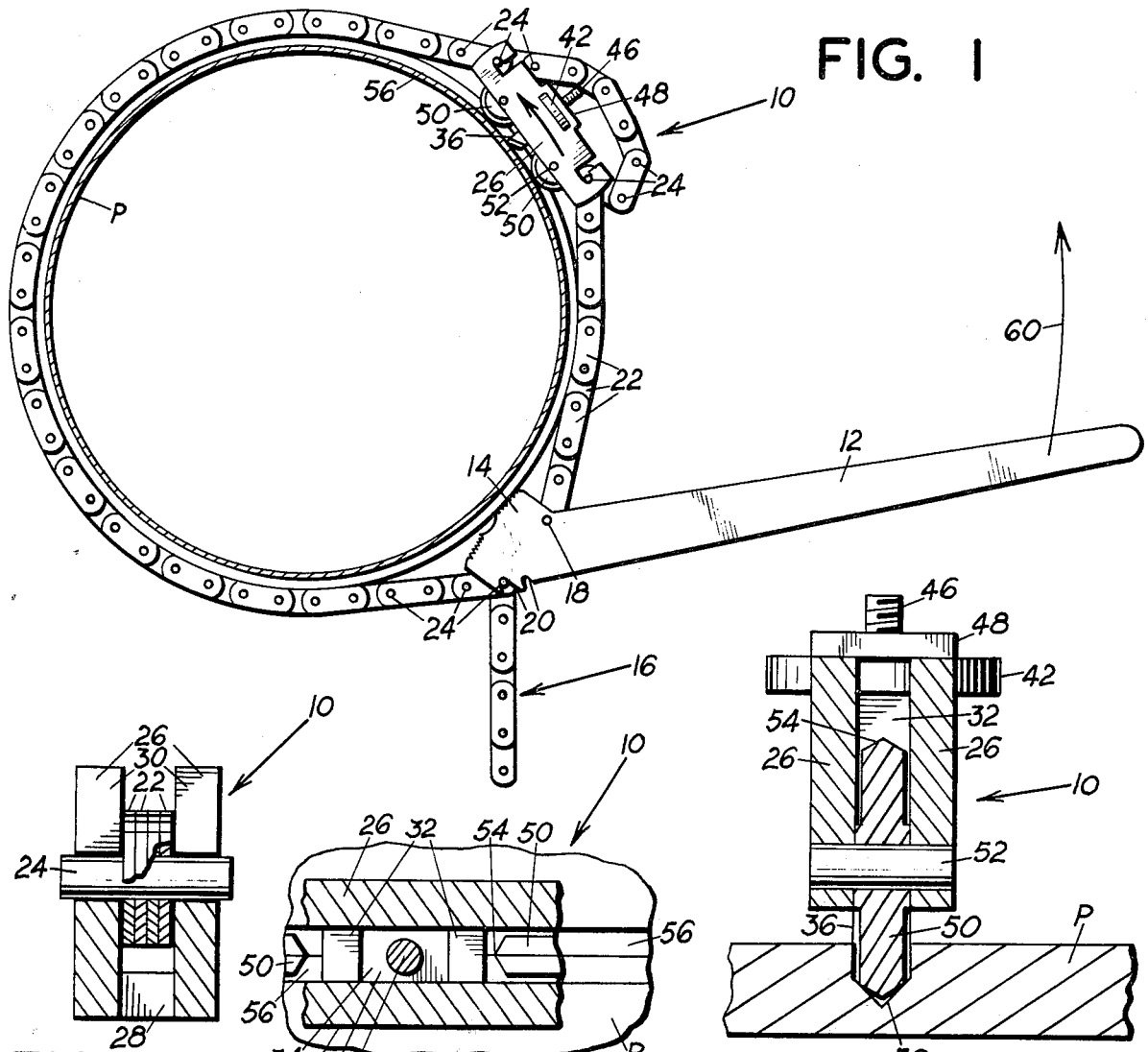
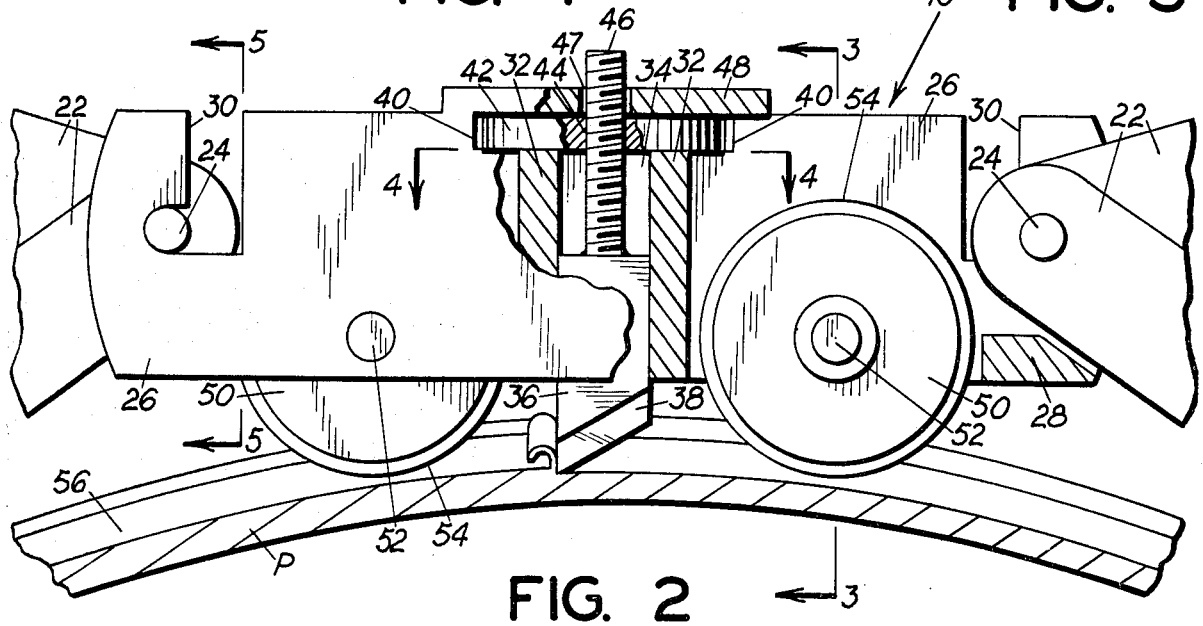

PIPE CUTTER

BACKGROUND OF THE INVENTION

This invention relates to new and useful improvements in pipe cutters.

Many types of manually operable pipe cutters have heretofore been provided for use by plumbers or other workmen in cutting pipes to selected length. Such tools are rather bulky in that each must employ means providing encircling support on the pipe, manual grip means for rotating the cutter around the pipe, and means for increasing the depth of the cutter bit as the cutting operation progresses. Exemplary tools of this type are illustrated in U.S. Pat. Nos. 2,433,606 and 3,243,878. Not only are such tools bulky for the workmen to carry around but also are expensive to manufacture.

SUMMARY OF THE INVENTION

According to the present invention and forming a primary objective thereof, a pipe cutter is provided that overcomes the deficiencies of prior devices in that it is compact in size and relatively inexpensive to manufacture.

A more particular object of the invention is to provide a pipe cutter that is adapted in its use in combination with a conventional chain pipe wrench such that it can be readily attached in the chain of such a wrench and utilized in a reverse operation of the wrench to accomplish a pipe cutting operation.

Another object is to provide a pipe cutter of the type described employing novel means for guiding the cutter around the pipe as a cut progresses and for gauging the depth of the cut.

The invention will be better understood and additional objects and advantages will become apparent from the following description taken in connection with the accompanying drawings which illustrate a preferred form of the device.

BRIEF DESCRIPTION OF THE DRAWINGS

FIG. 1 is a side elevational view of the present pipe cutter attached to a conventional chain pipe wrench and shown in a cutting operation;

FIG. 2 is an enlarged elevational view, partly broken away, of the pipe cutter;

FIG. 3 is a vertical sectional view taken on the line 3—3 of FIG. 2;

FIG. 4 is a fragmentary horizontal sectional view taken on the line 4—4 of FIG. 2; and FIG. 5 is a vertical sectional view taken on the line 5—5 of FIG. 2.

DETAILED DESCRIPTION OF A PREFERRED EMBODIMENT

With particular reference first to FIG. 1, the pipe cutter of the present invention is designated generally by the numeral 10. It has detachable use with a chain pipe wrench of conventional construction. Such a wrench comprises a lever handle 12 terminating at its inner end in a toothed head 14. Handle 12 is associated with a chain 16 connected at one of its ends to an offset point 18 on the head to provide eccentric operation of the lever handle on a pipe P. Notches 20 are provided on the opposite side of head 14 for removable engagement with a free end portion of the chain. The chain 16 is formed of a plurality of links 22, also seen in FIG. 5, having pivot connections in the form of pins 24 that are of a length to project laterally beyond the sides of the chain. The head of the lever 12 is bifurcated for receiving the chain to make the connection 18, and pins 24 have selected engagement in oppositely aligned pairs of notches 20 for varying the effective length of the chain.

With particular reference now to FIGS. 2-5, the pipe cutter 10 is U-shaped in cross section, having parallel side walls 26 and short length bottom wall portions 28 leading inwardly from each end. The top and ends of the body member are open. A pair of laterally aligned key slots 30 are provided adjacent each end of the cutter. These slots lead downwardly from the top edge of the side walls and are dimensioned and arranged to removably receive projecting end portions of pins 24 of chain 16. By means of this structure, the cutter is adapted to be connected into the chain intermediate the ends of the latter, as shown in FIG. 1, with the necessary excess chain to accomplish the connection extending above the cutter.

Disposed within the body portion intermediate its ends and integrally therewith is a guide housing 32 having a vertical opening 34 slidably receiving a cutter bit 36. The opening 34 and cutter bit 36 are of corresponding size so that the cutter bit while being vertically slidable is confined against lateral play. The guide housing 32 is open at the bottom and the cutter bit is adapted to project therefrom for engaging a pipe to be cut. The bottom end of the cutter bit 36 has an angled and tapered cutting edge 38 similar to a lathe cutter tool.

Guide housing 32 terminates short of the upper end of the body member and the side walls 26 are notched at 40 in this area to receive an ajusting nut 42 having a central threaded bore 44 engageable with a threaded post 46 integral with and extending upwardly from the top end of the cutter bit 36. By rotating the nut 42, the cutter bit 36 can be adjusted to selected projecting distances below the bottom wall 26. Threaded post 46 extends through an aperture 47 in cover plate 48 secured on the top of the body member.

A pair of wheels 50 have free turning engagement or lateral axles 52 supported in the side walls 26, such pair of wheels being disposed longitudinally on each side of the cutter bit. As best seen in FIG. 3, the wheels 50 have a centrally peaked peripheral edge 54, and in a cutting operation to be described, these wheels are adapted to ride in a cut 56 made by the cutter bit, whereby to guide the cutter around the pipe by engagement in the cut. In the preferred arrangement illustrated, the wheels 50 are narrower than the cutter bit 36 and have less taper than the cutting edge 38. They also extend downward from the bottom edges of side walls 26 sufficiently to space the latter from the outer periphery of a pipe P during the complete cutting operation. The wheels thereby form a base against which the cutter 36 may be adjusted by the nut 42 to vary the depth of cut. The wheels thus serve as gauge wheels to maintain the adjusted depth of cut.

In the operation of the present cutter 10, it is hooked in the chain 16 of a chain pipe wrench as shown in FIG. 1 by engagement of the pins 24 of spaced links 22 with the key slots 30. Thereupon, the chain is wrapped around the pipe and slack taken up by hooking a selected pin 24 adjacent the free end of the chain to a selected pair of the notches 20. The cutter bit is adjusted by nut 42 to have cutting engagement with the pipe P whereupon the pipe wrench is then operated in the direction which is the reverse of that at which the wrench has gripping connection on a pipe, namely in the direction of arrow 60 in FIG. 1. The first revolution around the pipe produces a shallow cut and the cut is deepened in subsequent revolutions automatically as the guide and gauge wheels 50 track in the cut. After a few revolutions of the tool around the pipe, the latter will be severed.

After the pipe has been cut, the free end of the chain is released from the notches 20 in the lever handle 12 and the cutter 10 is detached from the chain. The cutter can then be stored until again needed and the chain pipe wrench can in the meantime be utilized for its intended purpose. Since the cutter 10 does not require its own operating means, it is economical to manufacture and compact for storage.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A pipe cutter comprising
   a. a chain pipe wrench including a chain,
   b. a lever handle having an eccentric pivot connected to said chain,
   c. pipe engaging means on said lever handle arranged for gripping connection with a pipe in one direction of rotation of the lever handle,
   d. a body member having top and bottom portions and opposite end portions,
   e. means adjacent opposite end portions of said body member connected to spaced points on said chain,
   f. and a cutter bit on said body member having a cutter end projecting beyond the bottom portion of said body member,
   g. said cutter bit being arranged to cut a pipe upon reverse sliding movement of the chain around the pipe from that at which the lever handle has gripping connection on the pipe.

2. The pipe cutter of claim 1 wherein said means on the body member for connection to spaced points on the chain is arranged for removable connection to the chain whereby to selectively vary the length of the chain as necessary.

3. The pipe cutter of claim 1 wherein said means on the body member for connection to spaced points on the chain comprise key slots arranged for removable connection to the chain whereby to selectively vary the length of the chain as necessary.

4. The pipe cutter of claim 1 including gauge wheels on said body member disposed longitudinally on each side of said cutter bit and arranged to ride in a cut made by said cutter tool.

5. The pipe cutter of claim 1 including adjusting means for said cutter bit in said body member for moving it selected distances beyond the bottom portion of said body member for varying the depth of cut in a pipe by said cutter bit.

* * * * *